Sept. 24, 1963 H. E. WALKER 3,104,756
MECHANISM FOR TRANSFERRING INDIVIDUAL FISH
Filed Aug. 13, 1959 6 Sheets-Sheet 1
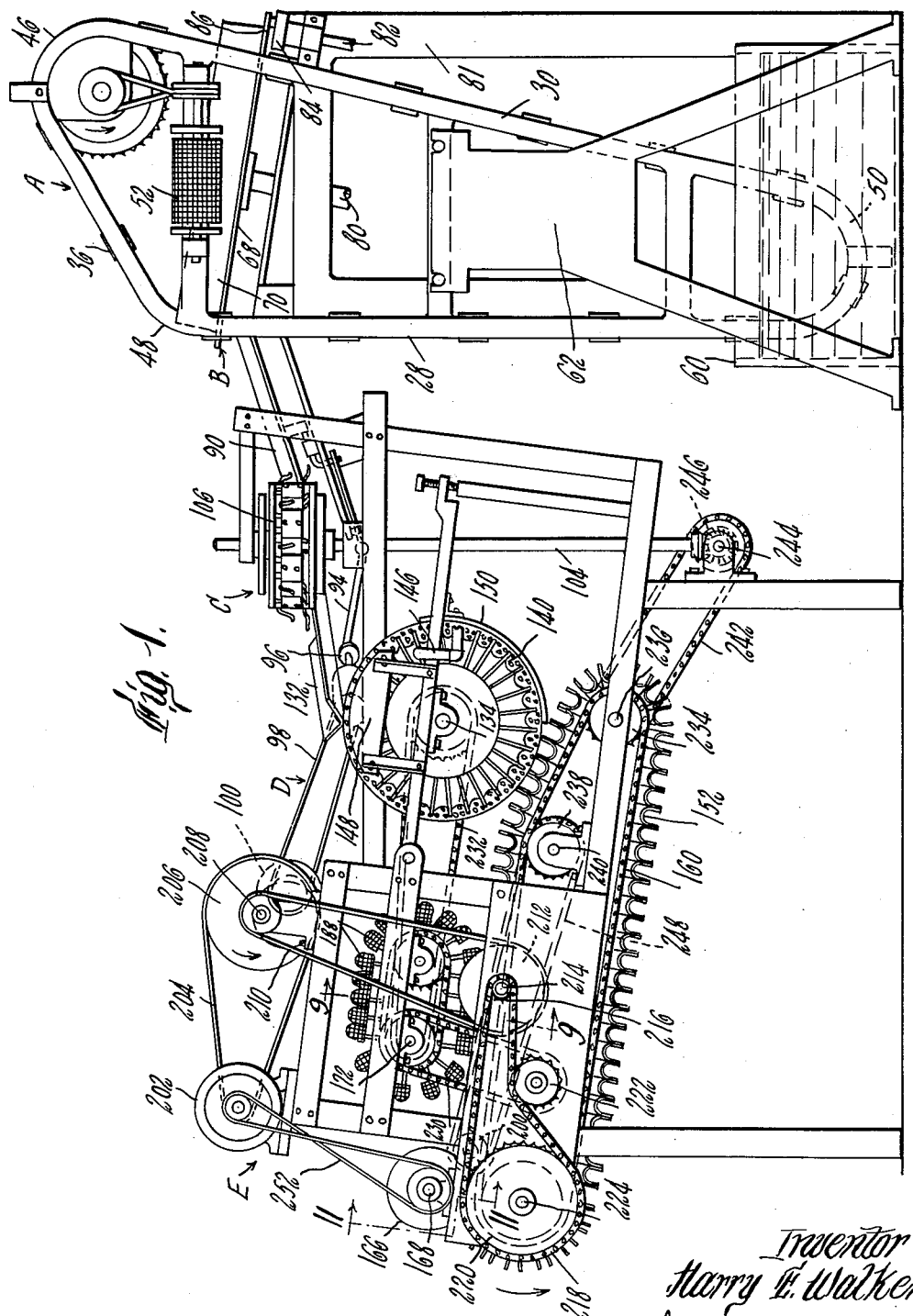
Inventor
Harry E. Walker
by Moore & Altman
Attys.

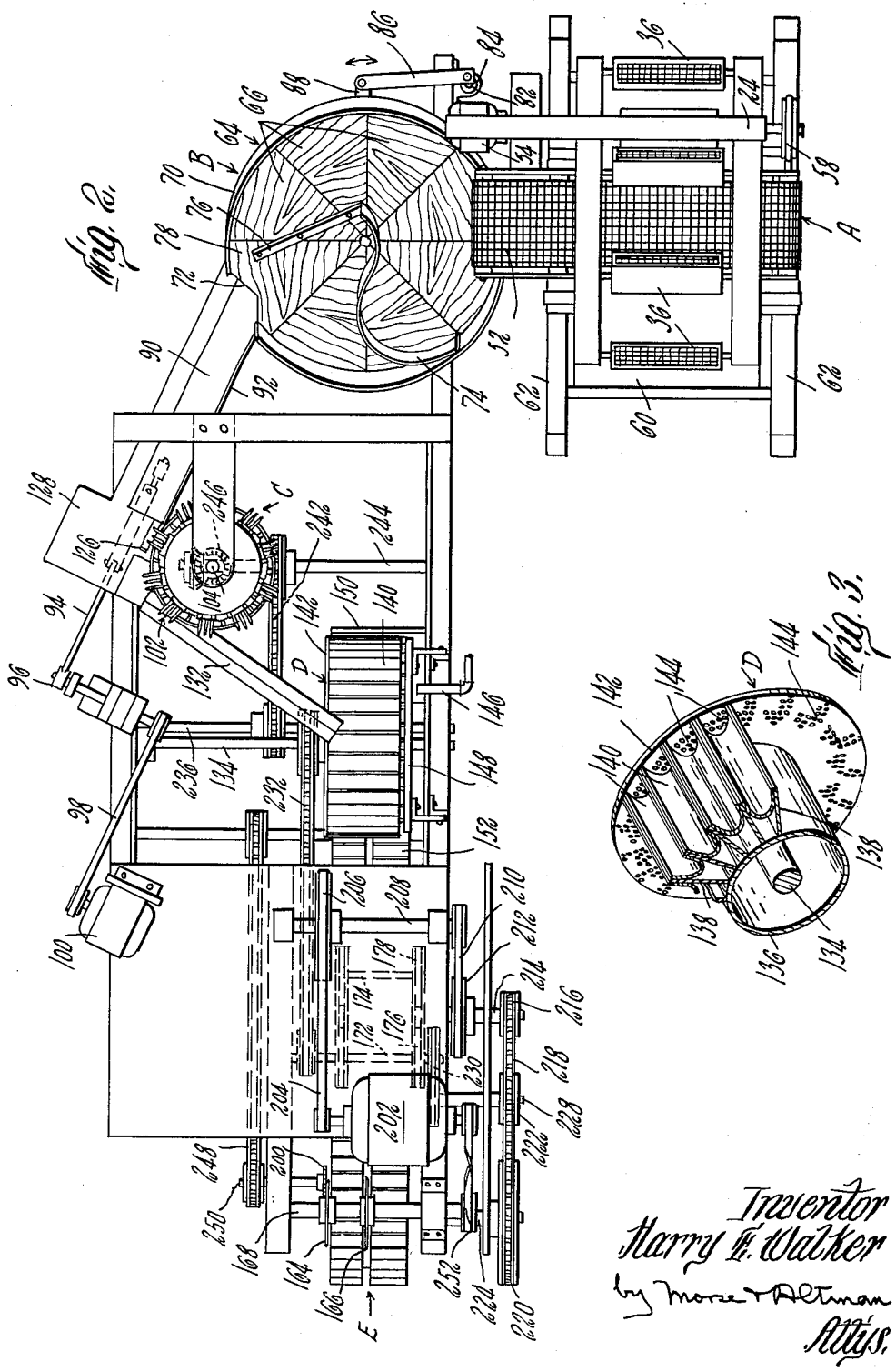

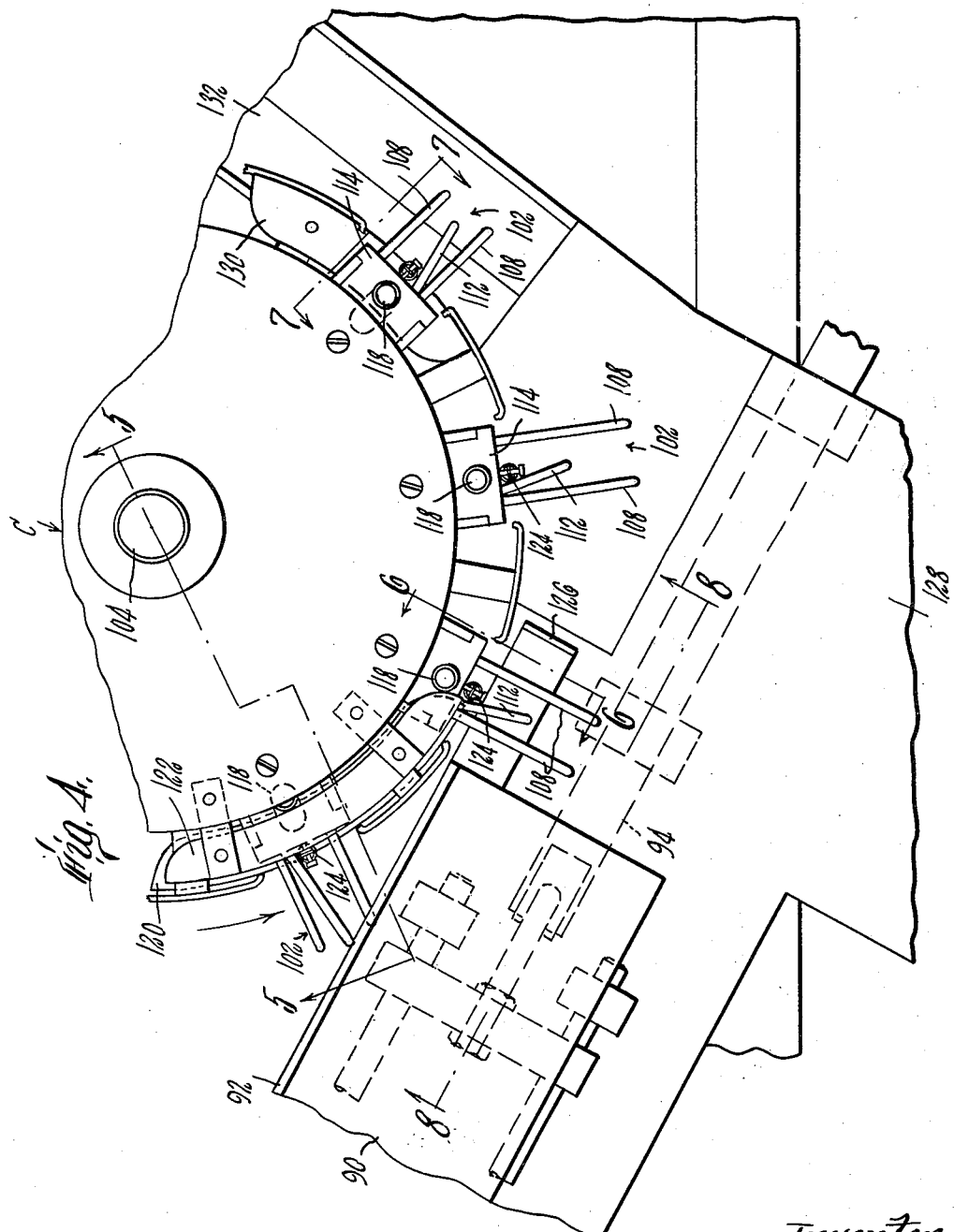

Sept. 24, 1963  H. E. WALKER  3,104,756
MECHANISM FOR TRANSFERRING INDIVIDUAL FISH
Filed Aug. 13, 1959  6 Sheets-Sheet 4
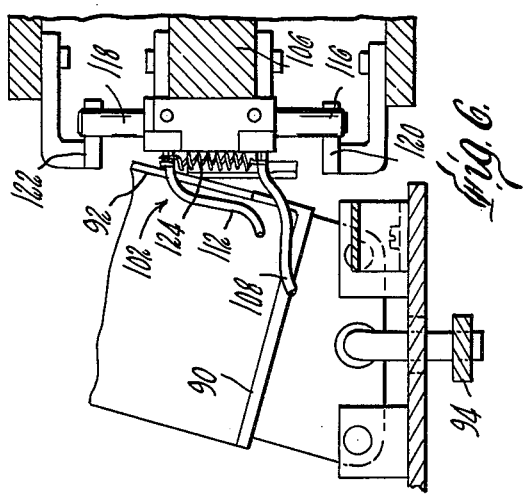
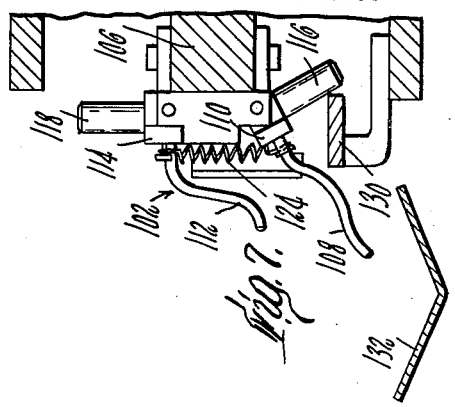
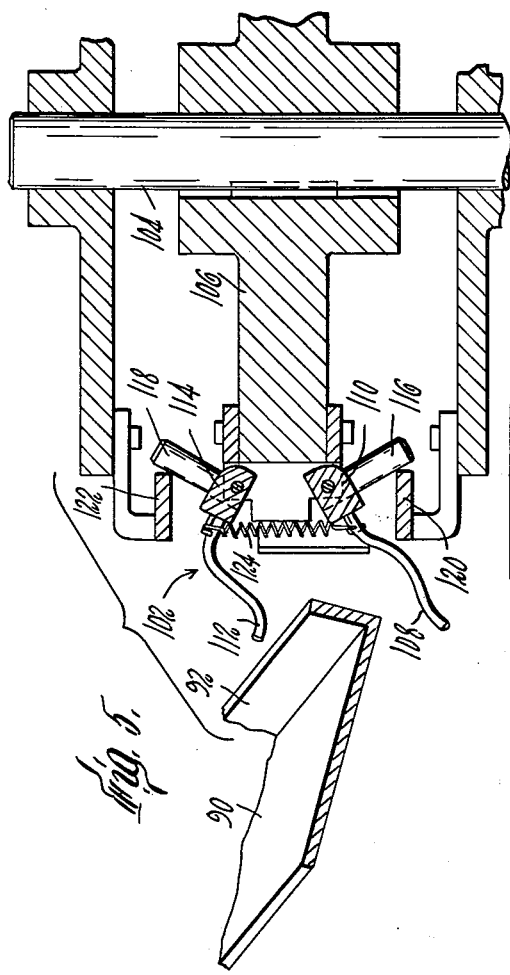
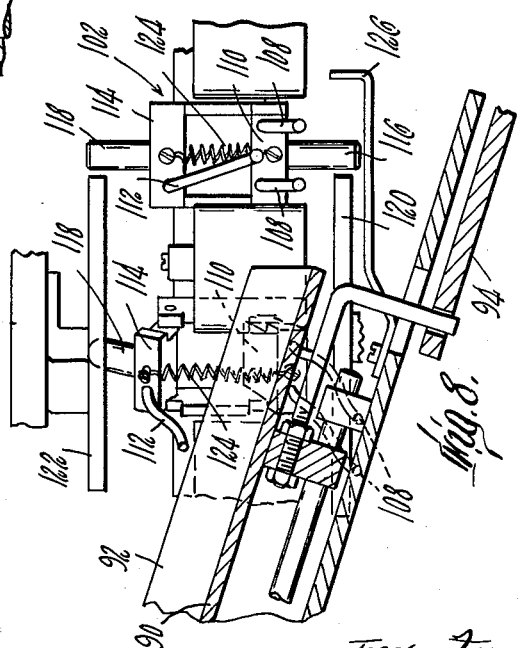
Inventor
Harry E. Walker
by Morse + Altman
Attys.

Sept. 24, 1963  H. E. WALKER  3,104,756
MECHANISM FOR TRANSFERRING INDIVIDUAL FISH
Filed Aug. 13, 1959  6 Sheets-Sheet 5
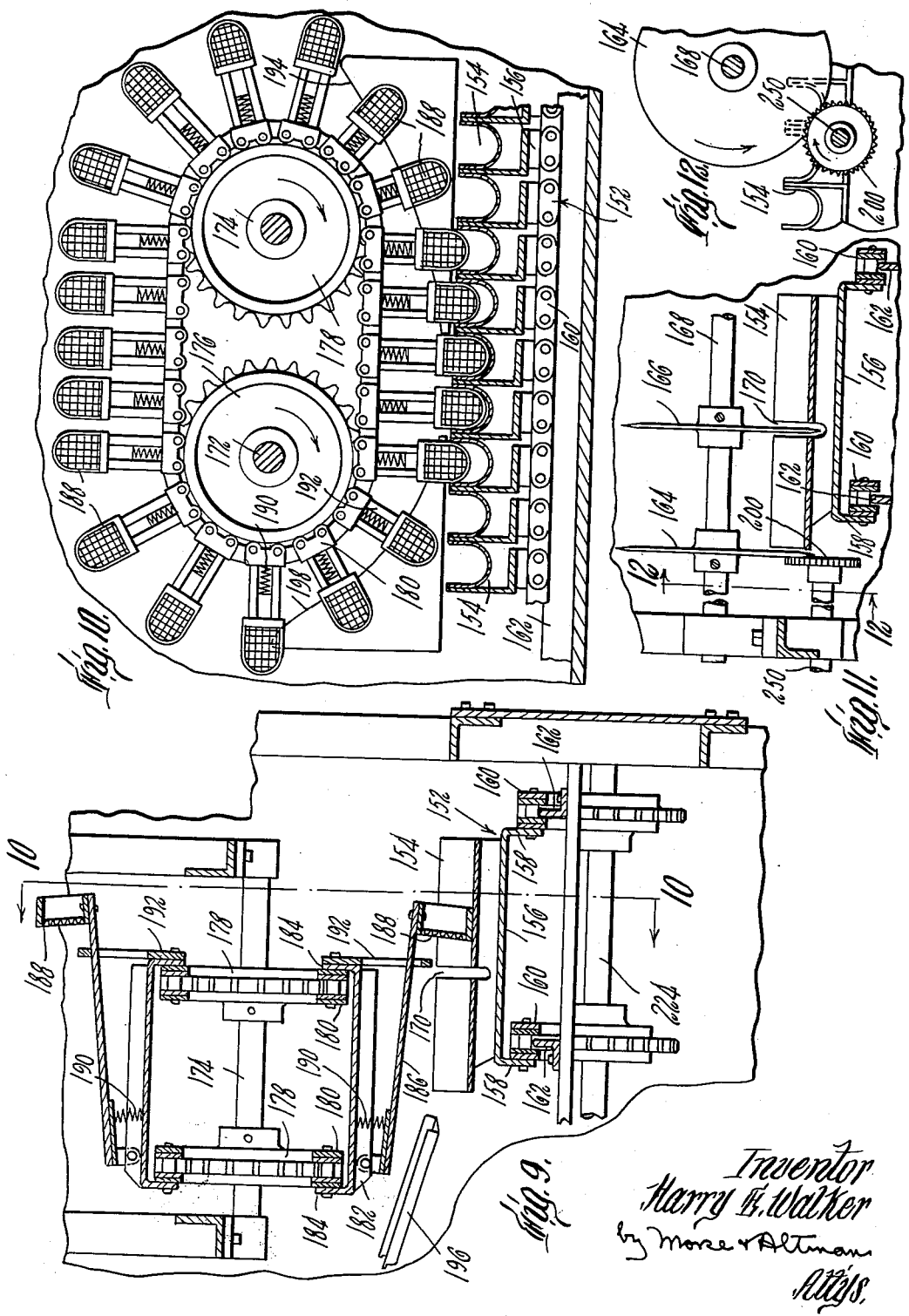

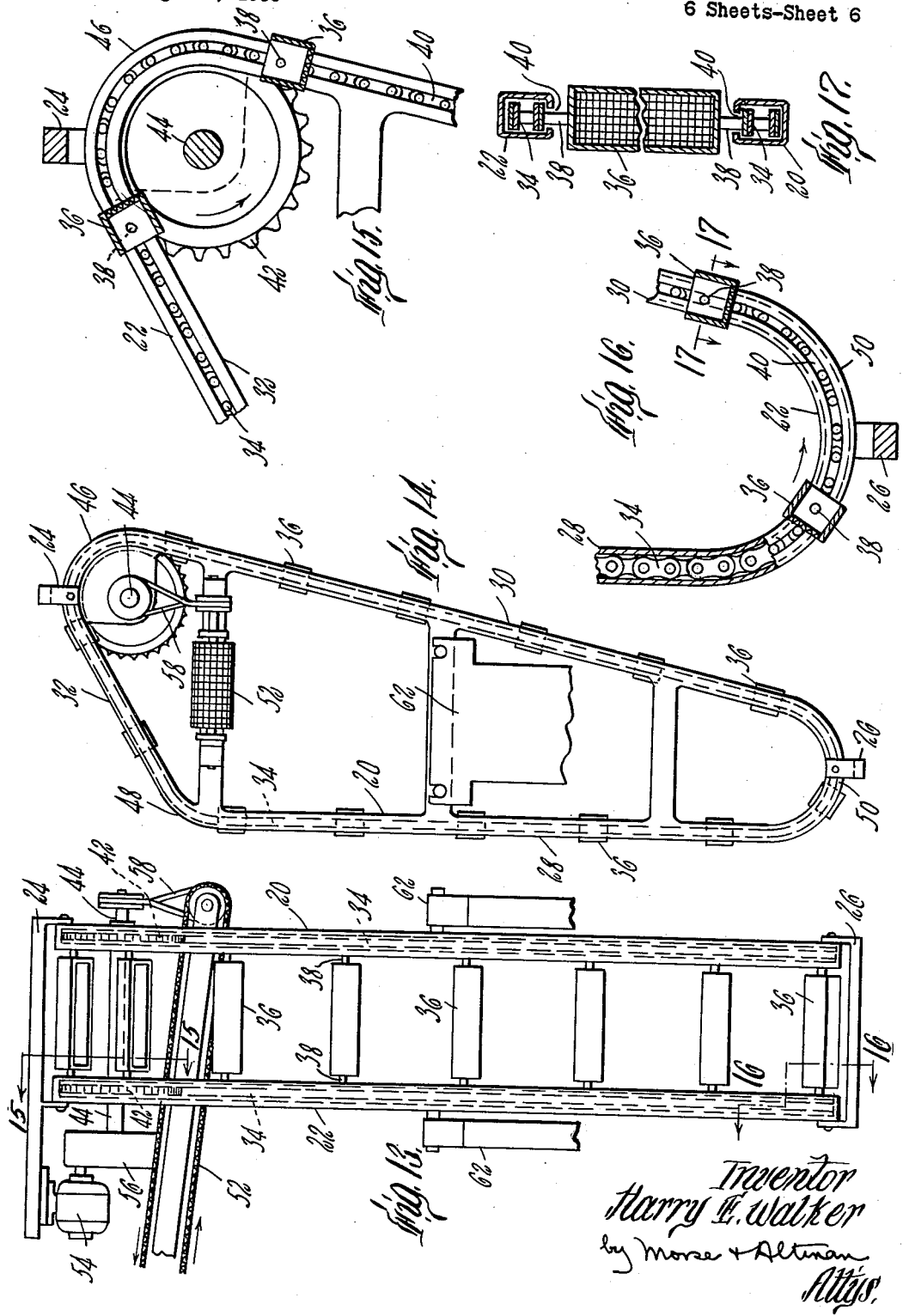

United States Patent Office 3,104,756
Patented Sept. 24, 1963

3,104,756
MECHANISM FOR TRANSFERRING
INDIVIDUAL FISH
Harry E. Walker, Portland, Maine
(Rte. 2, Mechanic Falls, Maine)
Filed Aug. 13, 1959, Ser. No. 833,482
5 Claims. (Cl. 198—210)

This invention relates to mechanism for picking up fish from a vat or tank, orienting the fish so that they all travel headfirst, seizing the fish one at a time to advance them in a single succession to compartments of a wheel from which the fish are deposited to successive troughs of an endless conveyor, and arranging each fish in its trough so that it will be cut at the right places when it is brought to the disk knives by the conveyor.

Mechanisms for performing some of these functions have been designed from time to time and have been operated with a certain degree of success but have not measured up to requirements of the fish packing industry for speed of operation and low percentage of improperly cut fish.

In the machine hereinafter described, faults of earlier machines are corrected, and improved portions of the machine make possible a more rapid operation of the machine together with a material reduction of waste. For a more complete understanding of the invention, reference may be had to the following description thereof, and to the drawings, of which—

FIGURE 1 is a side elevational view of a machine embodying the invention;

FIGURE 2 is a plan view of the same;

FIGURE 3 is a perspective view of the distributing wheel shown in FIGURE 1, part being broken away;

FIGURE 4 is a fragmentary plan view, on a larger scale, of a portion of the machine for snatching individual fish to transfer them one by one to a feed wheel;

FIGURES 5, 6, 7 and 8 are sectional views on the lines 5—5, 6—6, 7—7 and 8—8 respectively, of FIGURE 4;

FIGURE 9 is a sectional view, on a larger scale, on the line 9—9 of FIGURE 1;

FIGURE 10 is a section on the line 10—10 of FIGURE 9;

FIGURE 11 is a section on the line 11—11 of FIGURE 1, on a larger scale;

FIGURE 12 is a section on the line 12—12 of FIGURE 11;

FIGURE 13 is a rear elevational view of the elevating mechanism shown in FIGURES 1 and 2;

FIGURE 14 is a side elevation of the same;

FIGURE 15 is a fragmentary enlarged section on the line 15—15 of FIGURE 13;

FIGURE 16 is a fragmentary enlarged section on the line 16—16 of FIGURE 13; and

FIGURE 17 is a section on the line 17—17 of FIGURE 16.

The machine illustrated in FIGURE 1 comprises an elevator A, an orienting device B, a snatcher C, a gauging wheel D, and cutting mechanism E. It is designed for cutting fish small enough to be packed in the customary four-inch flat sardine cans, the minimum permissible number of fish to a can in Maine being four. As the choicer part of the fish is the portion adjacent to the tail, it is desirable that when cutting fish over five inches in length the tail itself be cut off and a second cut be made four inches forward from the first cut. This four-inch portion adjacent to the tail is saved for packing, the remainder of the fish being waste. When cutting the smaller sizes of fish, that is, under about five inches in length, it is desirable to cut the fish at a point about an inch from the head end so as to remove the head only although the cut may be less than four inches from the base of the tail. In the case of the smaller sizes of fish, it is considered immaterial whether or not the tails themselves are cut.

Elevating Mechanism

Fish to be cut may be supplied to the orienting device B by any suitable means. In most packing plants, it will be necessary to elevate the fish from a vat or equivalent container in which is a pool of water containing the fish. The elevating apparatus A shown in FIGURES 1, 2 and 13–17 is designed to lift fish from a pool with a minimum of injury to the fish and therefore with a minimum of waste since broken fish are discarded. As shown, the elevator A comprises a rigid frame consisting of two closed loops 20, 22 of similar size and shape held in spaced parallel relation by transverse members 24, 26. The loops are vertically elongated, each tubular member having straight stretches 28, 30 which may, as shown in FIGURE 14, diverge upward, the upper ends of the straight stretches being connected by a sloping stretch 32. Within each of the tubular members 20, 22 is an endless flexible member, preferably in the form of a chain 34 of a type adapted to mesh with a sprocket wheel. To house chains of this kind, the tubular members 20, 22 preferably have rectangular cross-sections, as indicated in FIGURE 17. Attached to the chains 34 are a series of spaced receptacles 36 each of which extends horizontally between the tubular members 20, 22 and is connected to the respective chains 34 by short rods 38 which project from its ends through longitudinal slots 40 in the tubular members. The slot 40 in each tubular member is through the side wall thereof which is opposite to the other tubular member. The receptacles 36 are elongated, with open tops and screen bottoms, and are secured to the chains 34 in such a way that they are right side up when they ascend between the straight stretches 30 of the tubular members and are upside down when descending between the stretches 28 of the tubular members. To drive the chains 34 and the receptacles 36, a sprocket wheel 42 is provided in the upper corner of each loop. These sprocket wheels are of the same size and are mounted on the same shaft 44 so that they drive the chains 34 in step. The corners of the triangle formed by the stretches 28, 30, 32 of the tubular members are rounded as at 46, 48, 50 so that the chains slide freely around the loops. When each receptacle 36 reaches the upper end of the stretch 30 it passes around the sprocket wheels 42 and is tipped to the position indicated in FIGURE 15, thus dumping out the contents of the receptacle onto a screen conveyor 52 which has an upper stretch extending through both loops and out beyond the loops to any desired point to discharge fish which have fallen upon it from the receptacles 36.

To drive the elevator and the conveyor 52 a motor 54 is mounted on an extension of the transverse frame member 24 and is connected to the shaft 44 by a reduction gearing 56. The conveyor 52 may conveniently be driven by a belt connection 58 with the shaft 44.

The lower portion of the elevator dips into a pool to lift the fish therein. As the chains 34 are encased in the tubular members 20, 22, the only exposed moving parts within the pool are the troughs and their connecting rods 38 as they swing around the arcs of the portions 50 of the tubular members. This construction minimizes the tearing or crushing of fish in the process of scooping them up from the pool. The pool may be in any suitable container such as a tank or vat 60 over which the elevator is supported by a suitable frame 62. As shown on the drawings, the elevator and the conveyor 46 can be made as a portable unit which can be lifted from the frame 62 by suitable tackle (not shown) and lowered into other containers such, for example, as the hold of a fishing vessel.

Orienting Mechanism

Fish which are deposited on the conveyor 52 are allowed to fall onto a disk 64 the surface of which is composed of sectors 66 of quartered oak cut at an angle to the grain and mounted on a metal base 68. A rail 70 extends around the periphery of the disk except for a gap 72 at a point nearly opposite to the conveyor 52, the periphery of the disk being notched at that point (FIGURE 2). An S-shaped baffle 74 is mounted on the disk 64 extending from the peripheral rail 70 to near the center of the disk. A narrow batten 76 is fastened to the face of the disk converging toward the rail 70 and leaving a gap 78 between the batten and the rail near the gap 72 in the rail to guide fish on the disk to the gap 72.

The disk 64 and its base 68 are mounted on the end of a shaft 80 which is coaxial therewith and is journalled in bearings (not shown) on a frame 81. In operation the disk it rotationally vibrated at a high rate but small amplitude by a motor (not shown) which drives a shaft 82 on which is mounted an eccentric 84 connected by a link 86 to a lug 88 projecting from the periphery of the disk 64. The disk is tilted a few degrees from the horizontal, the low point of the periphery being at the lug 88. When the disk is being vibrated, fish deposited on the surface advance rapidly in a headlong direction if unobstructed. Those that go toward the right (in FIGURE 2) are funnelled by the batten 76 and rail 70 to the gaps 78 and 72. Those that go toward the left are turned by the baffle 74 and thereupon move in a counter-clockwise direction. The surface of the disk is kept wet by the fish deposited thereon, but an excess of water thereon is avoided by the use of the screen conveyor 52, which preferably inclines upward toward its discharging end and drains from the fish most of the water that may have been carried up with the fish in the elevator receptacles 36.

The Snatcher

From the disk 64 fish are discharged headfirst through the gap 72 onto a chute 90 which is an oak board with a flange 92 and is longitudinally vibrated to cause the fish thereon to advance without delay. The chute is connected by a link 94 to an eccentric 96 connected by a belt 98 to a motor 100.

Beside the lower end of the chute 90 is the snatcher C which comprises a circular series of gripping devices 102 (FIGURES 4 to 8) arranged to orbit around the axis of a vertical shaft 104 which is driven at constant speed by means hereinafter described. The gripping devices 102 are mounted on the shaft 104 by means of a disk 106 which is splined to the shaft. Each gripper 102 has two lower fingers 108 projecting radially outward from a block 110 which is pivoted to the periphery of the disk 106, and an upper finger 112 projecting outward from a block 114 pivoted to the disk 106 above the block 110. The fingers 108 and 112 are rockable about the pivots of the blocks 110 and 114 to move toward each other to close the gripping device or to move away from each other to open the gripping device. For this purpose cam followers 116 and 118 are on the blocks 110 and 114, respectively, which engage suitable cams to rock the fingers 108 and 112 away from each other so as to open the gripping mechanism against the tension of springs 124 which tend to pull the fingers 108 and 112 to the closed position shown in FIGURE 6. As each gripping device approaches the lower end of the chute 90, the lower cam follower 116 engages a fixed cam 120 (FIGURE 4) and the upper cam follower 118 engages a fixed cam 122. The cams swing the fingers 108 and 112 to the wide open position which is maintained until the gripping device is just beyond the lower end of the chute 90 (FIGURE 8) whereupon the cam followers 116 and 118 move out of contact with the cams and permit the spring 124 to pull the fingers toward each other to grip a fish resiliently if one is at the moment sliding off the end of the chute or abutting a stop member 126 mounted below the end of the chute (FIGURES 4 and 8). In operation, the fishes are usually gripped before they reach the stop 126. If the fishes on the chute crowd each other, the extra ones fall off onto a sloping apron 128 down which they slide to a container or conveyor (not shown) by which they can be returned to the vat 60. When a fish is grasped by the fingers 108 and 112 of a gripping device it is swung around the axis of the shaft 104 until the cam follower 116 reaches a fixed cam 130 (FIGURES 4 and 7) which is mounted in a position to rock the lower fingers 108 downward when the fish is over a chute 132 set at an angle to the chute 90. The fish thus released falls into the chute 132 and slides down headfirst to the distributor wheel D. A stream of water (not shown) may be introduced into the chute 132 to promote the progress of the fish to the wheel D.

The Distributor Wheel

Beneath the lower end of the chute 132 the distributor wheel D revolves on a horizontal shaft 134 journalled in suitable bearings on the main frame of the machine. The wheel itself comprises a hub 136 (FIGURE 3) from which radiate a number of evenly spaced radial fins 138 carrying between their outer edges a series of troughs 140. These troughs are approximately semi-cylindrical and extend parallel to the axis of the shaft 134. The front ends of the troughs 140 are closed by a plate 142 which is a part of the wheel D and is perforated as at 144 at the end of each trough to permit the escape of water which is introduced in a stream from a nozzle 146. The lower end of the chute is located above the uppermost trough 140 in the wheel near the front end thereof so that a fish leaving the chute 132 falls into the trough which is then uppermost, its rearward progress being stopped by a fixed stop plate 148 mounted to span the rear ends of a few of the uppermost troughs in the wheel. The wheel as seen in FIGURE 1 is rotated clockwise so that fish deposited in the troughs from the chute 132 are carried around past the nozzle 146 to the bottom of the wheel. The stream from the nozzle 146 washes each fish toward the forward end of the trough until its tail engages the plate 142 which thus acts as a gauge to position the fish properly in its trough. To prevent the fish from falling out of the troughs prematurely a curved shield 150 is mounted opposite a lower quadrant of the wheel as indicated in FIGURE 1, this shield extending down almost to the lowermost point of the wheel at which point the fishes in the troughs are successively delivered to a conveyor 152 which carries them to the cutting mechanism.

Cutting Mechanism

The conveyor 152 is an endless series of open-ended troughs 154 which are similar in size and shape to the troughs 140. The wheel D and the conveyor 152 are driven synchronously so that, as indicated in FIGURE 1, each trough 140 as it moves beyond the lower end of the shield 150 has a trough 154 directly below it to receive a fish therefrom.

The wheel D is slightly offset forward with respect to the conveyor 152 so that fish which fall from the troughs 140 where the tails are against the gauge disk 142 into the troughs 154 of the conveyor will be located therein with their tails projecting a uniform distance out from the front end of the conveyor troughs. Each trough 154 is secured along one side edge to a bracket 156 which is mounted by means of ears 158 to two parallel endless chains 160 which are a part of the conveyor 152. As shown in FIGURE 10, when the chains run in a straight stretch, the successive troughs are contiguous. Rails 162 are mounted on the main frame for the portion of the conveyor approaching the fish-cutting knives 164 and 166 to run on. The knives are disk blades mounted on a common shaft 168. The knife 164 is tangent, or nearly so, to the front ends of the passing troughs 154. The knife 166 enters a slot 170 in each trough and its supporting bracket as they pass the knives, the slots 170 extending down below the bottom of the troughs 154 as indicated in FIGURES 9 and 11. For preparing fish to be packed in 4-inch cans, the knife 166 is spaced four inches from the knife 164.

A clamping mechanism which also acts as a gauge for the very small fish is mounted on the main frame over the stretch of the conveyor 152 which runs on the rails 162, but is offset forward with respect thereto as shown in FIGURE 9. Two parallel shafts 172 and 174 are journalled in suitable bearings above the conveyor 152. Mounted on the shaft 172 are a pair of sprocket wheels 176, and on the shaft 174 are similar sprocket wheels 178 aligned with the respective wheels 176. Endless chains 180 extend over the wheels 176 and 178, these chains being preferably similar in structure to the chains 160. Mounted on the chains 180 and spanning the space between them are a series of presser units the center lines of which have the same spacing as the center lines of the troughs 154. Each presser unit comprises a bracket 182 secured by ears 184 at its ends to links of the respective chains 180. Pivoted to each bracket 182 near its forward end is a lever arm 186 which extends rearward from the pivot to a point beyond the rear end of the bracket. At the rear end of each arm 186 is a foraminous clamping element 188 which is shaped to fit loosely in a trough 154 in a plane transverse to the axis of the trough. A compression spring 190 is provided for each arm 186 to press it outward from its bracket 182, that is, upward when the presser unit is in the upper stretch of the clamping mechanism and downward when the presser unit is in the lower stretch of the clamping mechanism. The outward movement of each arm 186 is limited by a rigid loop member 192 which is mounted at the rear end of its bracket 182. When the machine is operating, the presser units move in step with the troughs 154. A cam 194 (FIGURE 10) rocks the arms 186 inward as the units approach the troughs 154 and then gradually releases the arms to permit the clamping elements 188 to enter successive troughs 154. The length of the arms 186 is such that when a clamping element 188 enters a trough 154 it is spaced about five inches from the front end of the trough, that is, about an inch to the rear of the slot 170. If a fish of greater length than five inches from the tip of the head to the base of the tail is in the trough, the clamping element 188 will be pressed on it by the spring 190 so that the fish will be clamped thereby until it has passed a spout 196 which sends a stream of water into the forward end of each passing trough 154, the delivery end of the spout preferably having a width approximately equal to the width of two troughs. If the fish in the trough is less than five inches in length from the tip of the head to the base of the tail, the clamping element will bear on the bottom of the trough and will then act as a gauging element in conjunction with said stream of water which has a moderate velocity but sufficient volume to wash a small fish in the trough 154 toward the rear until its nose hits the clamping element 188 which thus locates the small fish properly for cutting. If the fish is longer than five inches, the clamping element 188 will hold it fast so that it will not be washed toward the rear in the trough by the stream. By means of these clamping elements which act as gauges for the small fish, the machine can handle without adjustment fish of any size which can be packed in four-inch cans as "sardines." After the troughs have passed the spout 196, the clamping elements 188 are lifted from the troughs by an edge cam 198 on which the arms 186 ride as the presser units swing up about the sprocket wheels 176. The fish in the troughs 154 are then carried to the knives 164 and 166.

If a fish is large enough to have been clamped by a clamping element 188, the knife 164 cuts off the tail which projects out from the front end of the trough, while the knife 166 cuts the body at a point four inches from the first cut, this four-inch portion being the choicest part of the fish. If the fish is less than five inches in length, the knife 164 will not cut the tail at all, but the knife 166 will cut the fish about one inch from the head end, thus removing the head but leaving practically all of the body for packing.

As the tails which project from the forward end of the troughs are usually somewhat limp, a supporting star wheel 200 is mounted adjacent to the edge of the knife 164 and the front end of the passing troughs. This wheel is small (e.g., 3" diameter) and has ⅛" teeth which carry the fish tails to the knife 164 as the wheel is rotated.

Driving connections for the snatcher, distributing wheel and cutting mechanism are shown in FIGURES 1 and 2. A motor 202 is connected by a belt 204 to a pulley wheel 206 on a shaft 208 which is connected by a belt 210 to a pulley wheel 212 on a shaft 214. This shaft also carries a sprocket wheel 216 which drives a chain 218 meshing with sprocket wheels 220 and 222. The sprocket wheel 220 is on a shaft 224 on which also are sprocket wheels 226 which drive the conveyor chains 162 (FIGURE 9). The wheel 222 is on a shaft 228 which is connected by sprocket wheels and chain 230 to the shaft 172 which drives the clamping mechanism shown in FIGURE 10. The shaft 172 is connected by sprocket wheels and chain 232 to the shaft 134 on which the distributor wheel D is mounted. The conveyor chains 160 mesh with idler wheels 234 on a shaft 236 and idler wheels 238 on a shaft 240. The shaft 236 is connected by sprocket wheels and chain 242 to a shaft 244 which in turn is connected by mitre gears 246 to the shaft 104 on which the snatcher C is mounted. The shaft 240 is connected by sprocket wheels and chain 248 to a shaft 250 on which the star wheel 200 is mounted.

The knives 164 and 166 are rotated at high speed by a belt connection 252 between the motor 202 and the shaft 168 on which the knives are mounted.

I claim:

1. In apparatus for supplying fish to a cutting machine, an inclined trough, a second inclined trough arranged with its upper end near the lower end of the first mentioned trough and extending in a direction making an angle with the first mentioned trough, a series of grasping mechanisms movable successively past the lower end of the first mentioned trough and the upper end of said second trough, each said mechanism including fingers movable toward and from each other in a direction transverse to the plane of movement of the mechanisms, means for operating said grasping mechanisms to close when the mechanism reaches the lower end of the first trough whereby to grasp a fish in said first trough and to open to release the grasped fish at the upper end of the second trough and means for moving said grasping mechanisms in a closed path.

2. Mechanism for grasping and releasing single fishes in succession, comprising an upright shaft, means for rotatably supporting said shaft, a series of sets of gripping fingers in a circular array around the axis of said shaft, means on said shaft supporting said sets of gripping fingers and moving them in a circular path, each set of gripping fingers comprising two lower fingers rockable together up and down and an upper finger rockable up and down, means for rocking said fingers as they move in their path to close each set when it reaches a certain point in its path and to open it at another point.

3. In an apparatus for preparing fish for packaging, a frame, an inclined chute supported by said frame, a stop member mounted near the lower end of said chute in position to be engaged by a fish sliding down said chute, a vertical shaft rotatably mounted on said frame and spaced laterally from said chute, a series of gripping devices attached to said shaft to revolve about the axis thereof in a circular path tangent to the lower end of said chute, each said gripping device including fingers movable away from each other in a direction transverse to the plane of movement of the gripping devices to open the device and toward each other to close the device, spring means urging said fingers to the closed position, cam means for momentarily opening each said device just before it reaches a position of proximity to said chute, means for opening each said gripping device after it has moved away from said chute, and means for driving said shaft.

4. In an apparatus for preparing fish for packing, a frame, an inclined chute supported by said frame, and means for gripping successive individual fish at the lower end of said chute, said gripping means comprising a structure rotatable about a substantially vertical axis, means supporting said structure near said chute, a series of sets of gripping elements carried by said structure, each said set of gripping elements including upper and lower fingers rockable toward and from each other to gripping and releasing positions, spring means urging said fingers toward each other, and stationary cam means successively engageable by said gripping elements as said structure rotates to move the gripping elements of each said set momentarily away from each other as they approach the lower end of said chute and again after they have passed the lower end of the chute.

5. In a fish-cutting machine, a supply chute, means supporting said chute in an inclined position, a second chute mounted at an angle to said supply chute and at a lower level, a stop member mounted below and extending beyond the lower end of said chute, a grasping mechanism mounted adjacent to said chutes, said mechanism comprising a series of spaced grippers each having upper and lower fingers movable toward and from each other to close and open the gripper, means for moving said grippers in a path past the lower end of said supply chute and the upper position of said second chute, the lower fingers of each mechanism passing the lower end of the supply chute below said end but above said stop member, and means for closing each said gripper as it reaches the lower end of said supply chute and for opening the closed gripper when it reaches the upper portion of said second chute.

References Cited in the file of this patent
UNITED STATES PATENTS

| | | |
|---|---|---|
| 828,865 | Spain | Aug. 14, 1906 |
| 1,437,415 | Hauter | Dec. 5, 1922 |
| 1,701,667 | English et al. | Feb. 12, 1929 |
| 2,180,303 | Baader | Nov. 14, 1939 |
| 2,365,714 | Magnusson | Dec. 26, 1944 |
| 2,371,748 | Fedorchak | Mar. 20, 1945 |
| 2,454,831 | Nordquist | Nov. 30, 1948 |
| 2,771,632 | Walker | Nov. 27, 1956 |
| 2,799,043 | Walker | July 16, 1957 |
| 2,803,035 | Bartels et al. | Aug. 20, 1957 |
| 2,888,131 | Allen | May 26, 1959 |
| 2,938,229 | Christie | May 31, 1960 |
| 2,973,548 | Walker | Mar. 7, 1961 |